No. 887,714. PATENTED MAY 12, 1908.
H. E. WARREN.
MOTION TRANSMITTING MECHANISM.
APPLICATION FILED MAR. 25, 1907.

3 SHEETS—SHEET 1.

Witnesses
C. Henry Chase
C. W. McEaul

Inventor
Henry E. Warren

No. 887,714. PATENTED MAY 12, 1908.
H. E. WARREN.
MOTION TRANSMITTING MECHANISM.
APPLICATION FILED MAR. 25, 1907.

3 SHEETS—SHEET 3.

Witness
J. B. Dodge
C. W. McCaul

Inventor
Henry E. Warren

UNITED STATES PATENT OFFICE.

HENRY E. WARREN, OF ASHLAND, MASSACHUSETTS, ASSIGNOR TO THE LOMBARD GOVERNOR COMPANY, OF ASHLAND, MASSACHUSETTS, A CORPORATION OF NEW JERSEY.

MOTION-TRANSMITTING MECHANISM.

No. 887,714.          Specification of Letters Patent.          Patented May 12, 1908.

Application filed March 25, 1907. Serial No. 364,410.

*To all whom it may concern:*

Be it known that I, HENRY E. WARREN, a citizen of the United States of America, and a resident of Ashland, in the county of Middlesex and Commonwealth of Massachusetts, have invented certain new and useful Improvements in Motion-Transmitting Mechanism for Use, Among other Purposes, in Regulating the Speed of Prime Motors, of which the following is a specification.

The invention relates to mechanism by which the motion of one operating part exerting a small force is accurately transmitted through another capable of exerting a great force, by which the initial force is multiplied; and among other uses, it may be employed to regulate the speed of a prime-mover or other apparatus, wherein the action of a device of relatively small power is employed to put into operation apparatus which is adapted to exert great power; such combination of mechanism is now commonly called relay-mechanism.

In the improved construction which is the subject of this invention, the movement of the device of small power is accurately duplicated in the movement of the apparatus which is capable of great power, and the operation of the latter begins and ceases substantially simultaneously with that of the former.

The invention as embodied in the concrete form illustrated, consists of twin clutch mechanisms of great power, each adapted to operate in a direction opposite to that of the other, upon a transmitting shaft, usually known as a terminal shaft, common to the two clutches, and a device of relatively small power, such as a centrifugal governor, or even hand power, to set the respective clutch mechanisms into action, preferably by screw or cam motion, and further, in the arrangement of the clutch mechanisms and their setting devices upon said shaft, so that the operation of either of the clutch mechanisms will react upon the setting device and release such clutch.

The invention further consists in novel means for controlling and regulating the operation of the clutch setting device, through the action of a speed governor, and in the clutching device by which the terminal shaft is rotatively connected with the power controlling mechanism for the prime-mover.

Figures 1, 2:
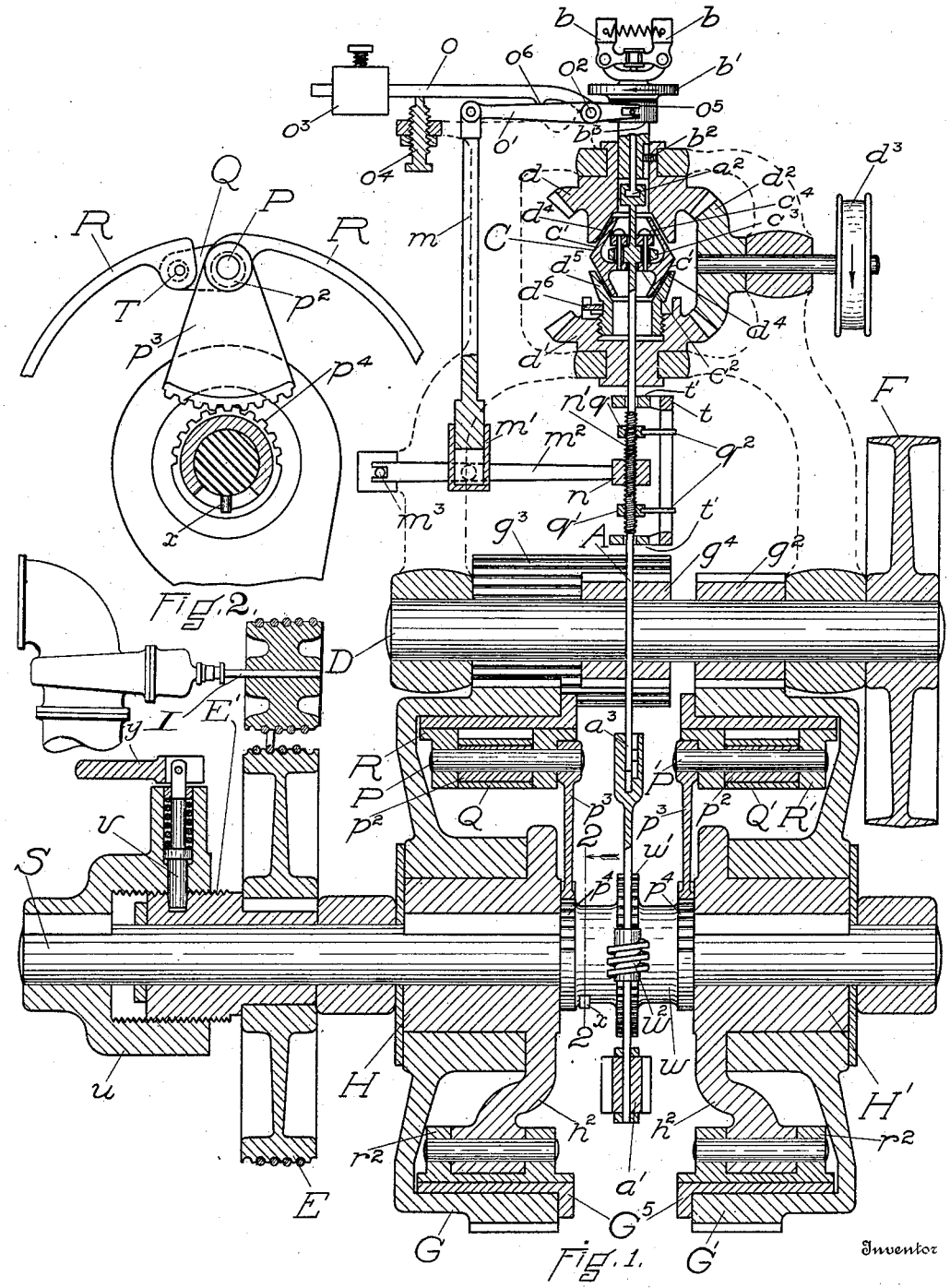
Figure 3:
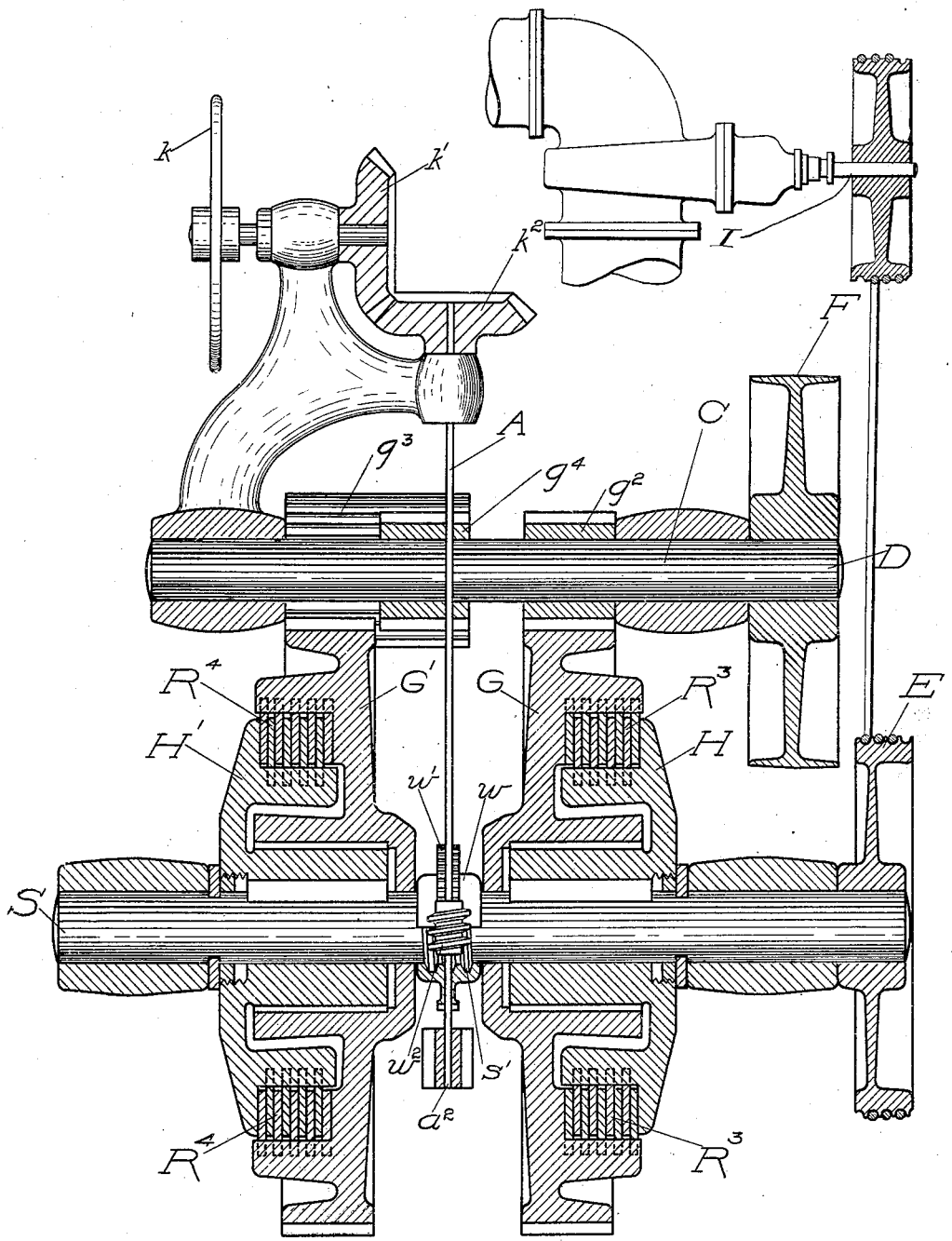
Figure 4:
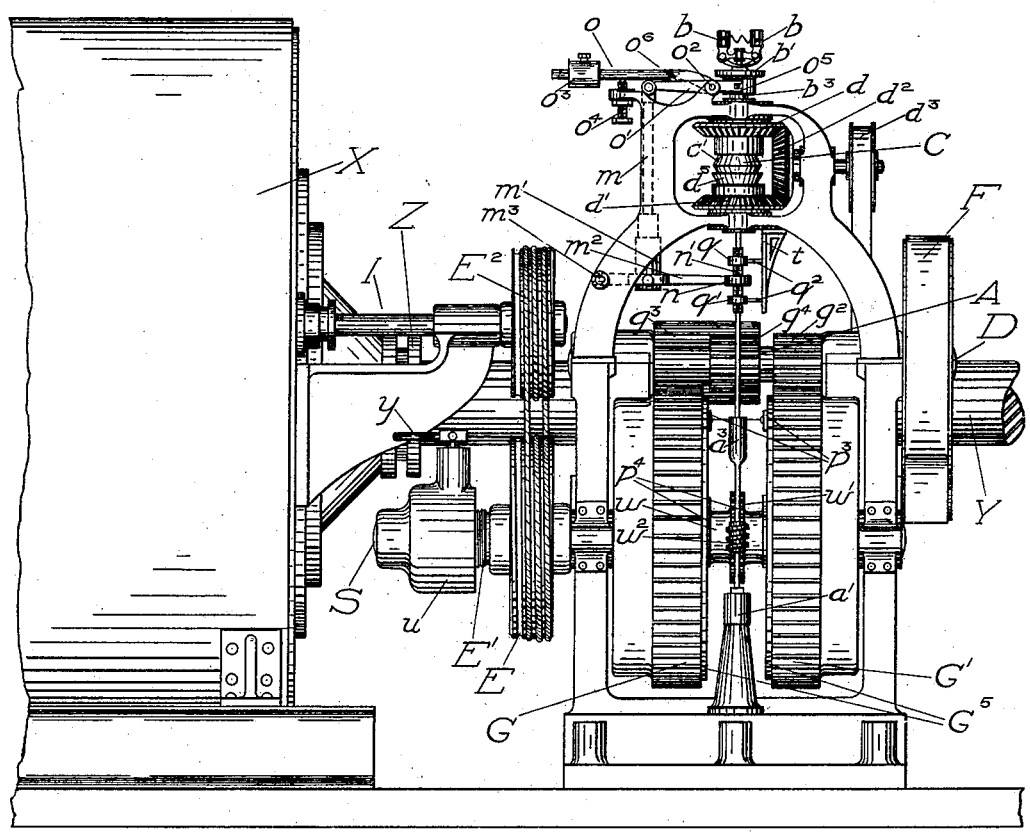

In the drawings forming a part of the specification, Figure 1 is an elevation chiefly in section, of one form of clutch mechanism in which a split expansible ring is employed as one member thereof within the rim of a rotating gear as the other member, and one form of controlling mechanism for the clutch setting device together with the clutching device by which the terminal shaft is rotatively connected with the power regulating mechanism for the prime-mover. Fig. 2 is a detail, partly in section, showing a portion of the split clutch-ring and of the devices for expanding the ring, viewed from the right at line 2—2, Fig. 1; Fig. 3 is a sectional elevation of another form of clutch mechanism, consisting of interleaved friction disks, alternate ones of which are loosely keyed to the respective clutch members, and also a modified form of controlling mechanism for the clutch setting device with means by which such device may be operated by hand; Fig. 4 is a front elevation of the improvements, showing their connection with a prime motor.

Referring to the drawings, in Fig. 1 the gears G, G', are each one member of the twin clutches which are normally loose upon the hubs H, H' keyed to the shaft S. The gears G, G' are rotated in opposite directions from connection with the driving shaft D, the gear G' by a pinion $g^2$ secured to the shaft D, and the gear G by an idler $g^3$ in mesh with another pinion $g^4$ also secured to the shaft D. The shaft D is driven by the pulley F from the main shaft Y.

Within the peripheral flange of the respective gears G, G' are split rings R, R', which constitute the other members of the two clutches. These rings are expanded and caused to frictionally engage the interior of the flanges of the gears G, G', by means of pins P, P', pivoted in lugs on one end of the split-rings. The pins P, P' have eccentric, or cam, middle portions $p^2$, $p^2$ which may turn in holes in one end of the links Q, Q', the other ends of the links being pivotally connected with the other ends of the split-rings by pins T, T', one of which is shown in Fig. 2, and which may also have eccentric middle portions by which small adjustments may be made to compensate for wear in the bearings of the pins P, P'. The rings R, R' are secured to the hubs H, H' by means of horns $h^2$, $h^2$ which radiate therefrom and are pinned to lugs $r^2$, $r^2$ on the interior of the rings; as illustrated, located diametrically opposite to the split in the rings. A friction sleeve $G^5$ may be placed within the rim of each gear G, G' to facilitate renewal when worn.

The cam pins P, P' are turned by means of toothed sectors $p^3$, $p^3$ secured to one end thereof and which mesh with teeth $p^4$, $p^4$ upon the respective ends of the hub $w$ of the worm-gear $w'$, which is loose on the shaft S between the two hubs H, H'. The worm-gear $w'$ is rotated by means of the worm $w^2$, keyed to the rod A supported at its lower end in a bearing $a'$. The upper end of the rod A is connected with the crank-levers of the centrifugal balls $b$, $b$, and has a swivel joint $a^2$. The hub $w$ may be limited in the extent of its rotary movement by means of a pin $x$, secured in the shaft S, and projecting into a slot in that hub.

The mechanism by which the centrifugal balls $b$ $b$, operate the controller for the worm $w^2$ consists of a pair of juxtaposed beveled gears $d$, $d'$, which have the same axis of rotation as the rod A and respectively mesh with a gear $d^2$ upon the shaft of driving pulley $d^3$, by which they are driven in opposite directions. The centrifugal balls $b$, $b$, are caused to revolve by means of a groove in a sleeve extension of their support $b'$, with which a key $b^2$ in the hub of the gear $d$ engages, and by which construction also, movement of the support $b'$ parallel with its axis is permitted.

In the opposed ends of the hubs of the gears $d$, $d'$ are internal coned surfaces $d^4$, and secured to the rod A between these coned surfaces is a clutch member C with double cone surfaces $c'$ the counterpart of the interior coned surfaces in the respective gears $d$, $d'$. The member C is hollow with a partition $c^2$ across its interior at one side of the middle of its length, and secured to the rod A within the area of the larger chamber in the member C is a collar $c^3$ rigidly attached to rod A and secured to the partition $c^2$ by means of screws $c^4$ passing through holes in the collar $c^3$, which holes are slightly larger than the shanks of the screws, so as to give sufficient play or lateral movement of the member C to accommodate small eccentricities between its conical surfaces and those of the interior coned surfaces of the gears $d$, $d'$, with which they frictionally engage, when the rod A is moved up or down; and to permit any needed adjustment between these opposed surfaces, the friction cone surface in the hub of the gear $d'$ is formed in a sleeve $d^5$ and screwed into the hub of that gear. This sleeve may be locked to the gear $d'$ by a screw $d^6$. The middle portion of the rod A is connected with the lower portion by a spline and groove at $a^3$ to allow sufficient longitudinal play for setting the clutch members C and $d$ or $d'$.

Mechanism by which the action of the centrifugal balls $b$, $b$, upon the controller mechanism C, $d$, $d'$ is temporarily neutralized, is substantially the same as that shown and described in this applicant's co-pending application Serial No. 364,409, and consists of a two-part lever $o$, $o'$, both portions of which are pivoted at $o^2$, the part $o$ having a counterweight $o^3$ and an adjustable stop $o^4$, while the part $o'$ is provided with a yoke which embraces the sleeve $b^3$ of the support $b'$, the forked ends $o^5$, of which yoke, engage trunnions on said sleeve. The part $o$ of said lever also has a bearing as $o^6$ upon the part $o'$. The outer end of the part $o'$ is connected by a rod $m$ with the plunger of a dashpot $m'$, conventionally represented, which dashpot is pivoted to a lever $m^2$, pivoted on a fixed bearing $m^3$ at one end, and at the other end to trunnions, that do not appear in the sectional view, on the large nut $n$ which engages a screw-threaded portion $n'$ of the rod A. $q$, $q'$ are nuts also on the screw-threaded portion $n'$ of the rod A, and are provided with fingers $q^2$ which project into a slot in the fixed piece $t$ and prevent the rotation of those nuts, also stops $t'$ respectively above and below the nuts $q$, $q'$, limit their vertical movement, and when by the action of the screw $n'$ within the nuts, either of them is forced against a stop $t'$, the further rotation of the screw $n'$ will move the rod A up or down and thus disengage the friction surfaces of the double cone C and the gears $d$ or $d'$ and prevent the centrifugal governor from "over-running."

Referring to Fig. 1, E is a sheave on a hub E' normally loose on the shaft S, which sheave is to be connected by cable with a sheave $E^2$, (see Fig. 4) on the gate-shaft I of a water-wheel or other apparatus X needing great power for its operation, and through which, power is supplied to a water-wheel or other prime-mover. The hub E' is screw-threaded at one end and engages a screw-thread within a sleeve $u$ keyed to the shaft S. Rotative connection between the hub E' and the shaft S is made by means of a clutching device consisting of a spring pressed pin $v$, arranged to be moved out and in within a guide-way in the sleeve $u$. The inner end of the locking pin $v$ engages a socket in the hub E' only when the hub E' and the sleeve $u$ are relatively in proper axial and circumferential position. This locking of the sleeve $u$ to the hub E' is regulated by the position of the socket in that hub, for the pin $v$, so that it will occur only when the gate occupies the proper relative position with respect to the governor When opening the gate to start the prime-mover, and if desired, when finally closing it, the hub E' may be disconnected from the shaft S by withdrawing the pin $v$ from the casket in the hub E' by means of a cam-lever $y$, and the pitch of the screw-threads on the hub E' and sleeve $u$ may be such that the sheave E can make several revolutions before the pin $v$ will be brought into accurate juxtaposition with its socket, and lock the two together. It will be understood that as soon as this occurs the gate will be under control of the centrifugal governor through the worm $w^2$, which puts the clutches G, G', R, R' into operation and thus causes the shaft S to rotate.

In Fig. 3 the clutches shown are of a well-known type, in which the loose gear-members, G, G' and the members H, H' fixed upon the shaft S, are provided with interleaved clutch-rings $R^3$, $R^4$, alternate ones of which are loosely keyed to the respective clutch members. The hub $w$ of the worm-gear $w'$ is interiorly threaded and engages a thread $s'$ on the shaft S, between the two loose clutch-members G, G'; so that when the worm-gear $w'$ is turned in one direction or the other by the operation of the worm $w^2$ on the rod A, the hub $w$ will by the action of the screw-thread $s'$ move against one of the loose members G or G', and push it toward a fixed member H or H', thus causing frictional engagement between the two series of interleaved clutch-rings $R^3$, $R^4$, and turn the shaft S. As soon as the rate of rotation of the shaft S is greater than that of the hub $w$, the screw thread $s'$ will react upon the hub, move it away from contact with the loose clutch-member and thus release the clutch. The means shown in Fig. 3 for operating the worm $w^2$ is a hand-wheel K, by which the rod A is turned, through the beveled gears $k'$, $k^2$, instead of by the centrifugal balls $b$, $b$, through the clutch-member C and the gears $d$, $d'$. This construction is well adapted for use in connection with steering gear aboard ships or for operating elevators, in which latter case the hand-wheel may be connected with the rod A, directly or by a band, or electrically.

The operation of the mechanism is as follows:—Referring to Fig. 1, when the prime-mover has been set in motion the centrifugal balls $b$, $b$, are continuously rotated therefrom through the pulley $d^3$ in the directions indicated by the arrows, and also through the driving pulley F, the shaft D and the gears G, G', these latter in opposite directions. Assuming that the positions of the several parts of the mechanism are as shown in Fig. 1, when the speed of the prime-mover is normal; if the speed decreases the centrifugal balls will be moved toward one another, and through their crank-levers will lower the rod A and with it the double friction cone C until its lower surface makes driving contact with the interior cone of the gear $d'$, and thus causes the rod A to rotate from left to right, or opposite to the hands of a watch, face up, as viewed in that figure; this will cause the worm $w^2$ also to rotate in the same direction and turn the worm-gear $w'$ with the toothed hub $p^4$ from right to left, as viewed in Fig. 2, causing the sector $p^3$ to swing to the left, and by means of the cam on the pin P acting through the link Q force the ends of the split-ring R apart thereby expanding it and causing it to frictionally grip the rotating gear G and revolve with it, and through the horn $h^2$ and the hub H cause the shaft S to revolve in the same direction. So long as the worm $w^2$ continues to rotate at the same relative speed as the gear G, the clutch-member R will continue in engagement with the clutch-member G. As soon, however, as the rod A has been lowered by the action of the balls $b$ due to decreased speed, and has been caused to revolve by the frictional engagement of the cone C with the gear $d'$, the nut $n$ will move downward on the screw-threaded portion $n'$ of the rod A, and lever $m^2$, dashpot $m'$, rod $m$, and the outer end of the lever $o'$ will all be lowered, and the inner end of the part $o'$ with the governor support $b'$ will be raised, together with the rod A, until the frictional engagement between the gear $d'$ and double cone C is relieved, when the rod A and worm $w^2$ will cease to rotate, and the worm $w^2$ will hold stationary the worm-gear $w'$ and its toothed hub, thereby causing the sector $p^3$ to swing back and release the clutch members R and G and stop the rotation of the shaft S and shaft I. During the rotation of the shaft S the gate or valve of the prime-mover X has been partially opened by the connection of said shafts through the sheaves $E^2$, the hub E' of which latter sheave E is locked to the shafts S by the spring pressed clutch pin $v$ engaging the socket in the sleeve E'. Meantime the speed of the prime-mover having been increased and with it the speed of the balls $b$, $b$, they slowly return to their normal position, and during the same interval of time the weight of the balls and their support $b'$ has brought back the lever $o'$ to the bearing $o^6$ on the lever $o$ through the transfer of the liquid in the dashpot $m'$, which action also brings the governor support $b'$ to its normal position and all parts of the mechanism are in equilibrium again with the gears G, G', running free from the ring clutch-members R, R'. If the speed of the prime-mover increases the centrifugal balls $b$, $b$, will move away from one another, thereby raising the rod A and causing the friction cone C to make contact with the cone surface in the sleeve $d$ and thus turn the rod A and worm $w^2$ in the opposite direction, and cause the other clutch mechanism to operate and turn the shaft S and sheaves E, $E^2$ so as to tend to close the gate of the prime-mover and decrease its speed. The nuts $q$ and $n$ will be operated in the reverse direction and release engagement between the cone C and friction surface of gear $d'$, and also momentarily lower the governor support $b'$. The speed of the prime-mover meantime having been decreased, the balls $b$, $b$, will assume their normal position, and the counterweight on the lever $o$ will, through its action upon the liquid in the dashpot, return the support $b'$ to its normal axial position. The pitch of the thread of the worm $w^2$ should be such, that although its rotation in either direction will readily turn the gear $w'$, there can be no reciprocal driving action by the gear $w'$ upon the worm $w^2$.

I claim:—

1. In motion transmitting mechanism, a transmitting shaft, a pair of oppositely rotated clutch-members loose on said shaft, a fixed clutch member on the shaft, for each loose member, a clutch setting device adapted to be turned in either direction on the shaft, between the two pairs of clutch members, and means independent of said clutches and shaft to rotate the clutch setting device to set the respective clutches and turn the transmitting shaft.

2. In motion transmitting mechanism, a transmitting shaft, a pair of oppositely rotated clutch-members loose on said shaft, a fixed clutch-member on the shaft, for each loose member, a clutch setting device adapted to be turned in either direction on the shaft between the two pairs of clutch-members, means independent of said clutches and shaft to rotate the clutch setting device to set the respective clutches and turn the transmitting shaft, and means to react upon the clutch-setting device to release the set clutch automatically when the shaft is rotated faster than the setting device.

3. In motion transmitting mechanism, for speed regulation, a transmitting shaft, a pair of oppositely rotated clutch-members loose on said shaft, a fixed clutch-member on the shaft for each loose member, a clutch setting device between the two pairs of clutch members on the shaft, which device is to be turned thereon to set either pair of clutch members, a speed governor, and means actuated thereby to operate the clutch-setting device at each change of speed of the mechanism to which motion is transmitted.

4. In motion transmitting mechanism for speed regulation, a prime motor, means to control the power supply therefor, a motion transmitting shaft connected with said means, a pair of oppositely rotated clutch-members loose on said shaft, a fixed clutch-member on the shaft for each loose member, a clutch setting device between two pairs of clutch members on the shaft, which device is adapted to be turned thereon to set either pair of clutch members, a speed governor, means actuated thereby to operate the clutch setting device at each change of speed of the prime-motor, and means actuated by the transmitting shaft to release the set clutch automatically, when the shaft is rotated faster than said setting device.

5. In motion transmitting mechanism for speed regulation, a prime motor, means to control the power supply therefor, a motion transmitting shaft connected with said means, two oppositely acting clutches on said shaft, a clutch setting device adapted to be turned in either direction on the shaft, between the two clutches, to set them respectively in action to turn the shaft, a primary speed controller having a rotating shaft, and connection between such shaft and the clutch setting device to rotate the latter in different directions for increase and decrease of speed.

6. In motion transmitting mechanism, a transmitting shaft, two oppositely acting rotary clutches on said shaft, a rotary clutch setting device on the shaft between the two clutches, means to rotate the clutch setting device in either direction, which means are provided with irreciprocal driving connection with the clutch setting devices.

7. In motion transmitting mechanism for speed regulation, a prime-mover mechanism to regulate the supply of motive power thereto, a terminal shaft in the transmitting mechanism, which shaft makes more than one rotation to effect the maximum movement of the power regulating mechanism, and automatic coupling devices which rotatively connect said regulating mechanism and terminal shaft, at a predetermined relative position.

8. In motion transmitting mechanism for speed regulation, a prime-mover mechanism to regulate the supply of motive power thereto, a terminal shaft in the transmitting mechanism, which shaft is adapted to make more than one rotation to effect the maximum movement of the power regulating mechanism, a fixed clutch member and a loose clutch member on the terminal shaft, the two members having screw-threaded engagement, and a device which automatically rotatively couples the two members together when by the rotation of said shaft they assume a predetermined definite circumferential and axial position in relation to each other.

HENRY E. WARREN.

Witnesses.
I. B. DODGE,
C. W. MCCAUL.